United States Patent [19]

Jäger et al.

[11] 3,895,933

[45] July 22, 1975

[54] PLANT GROWTH REGULANTS COMPRISING 2-HYDROXYETHYL-1-PYRIDINIUM-(1) SALTS

[75] Inventors: Gerhard Jäger, Wuppertal; Klaus Lürssen, Grosskoenigsdorf, both of Germany

[73] Assignee: Bayer Aktiengesellschaft, Leverkusen, Germany

[22] Filed: June 14, 1973

[21] Appl. No.: 370,067

[30] Foreign Application Priority Data
June 21, 1972 Germany............................ 2230179

[52] U.S. Cl. .............................. 71/94; 71/90; 71/76
[51] Int. Cl................................................ A01n 9/22
[58] Field of Search............................ 71/76, 90, 94

[56] References Cited
UNITED STATES PATENTS
3,655,359  4/1972  Krumklans et al..................... 71/94
3,697,251  10/1972  Long et al.............................. 71/94

OTHER PUBLICATIONS
Roth et al. Chem. Abst., Vol. 65 (1966) 3895F.

Primary Examiner—Lewis Gotts
Assistant Examiner—Catherine L. Mills
Attorney, Agent, or Firm—Burgess, Dinklage & Sprung

[57] ABSTRACT

Plant growth regulant compositions containing as an active ingredient a 2-hydroxyethyl-1-pyridinium-(1) salt of the formula

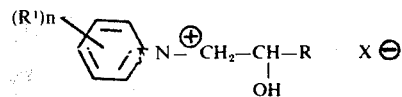

wherein
R is optionally substituted phenyl, furyl or thienyl,
$n$ is 1, 2 or 3
$R^1$ is hydrogen, alkyl of up to 6 carbon atoms or halogen, wherein the substituents $R^1$ are selected independently of one another when $n$ is 2 or 3; and
$X^\ominus$ is a halide or perchlorate ion;
the active ingredient is an admixture with a solid or liquefied gaseous diluent or carrier or in admixture with a liquid diluent or carrier and contains a surface-active agent.

7 Claims, No Drawings

PLANT GROWTH REGULANTS COMPRISING 2-HYDROXYETHYL-1-PYRIDINIUM-(1) SALTS

The present invention relates to plant-growth regulant compositions containing certain 2-hydroxyethyl-1-pyridinium-(1) salts, and to methods of regulating plant growth, employing such materials.

It is known that unsymmetrically substituted bis-pyridinium slats such as 4-dimethylamino-pyridinium-methyl-4'-oximinomethylpyridinium methyl ether dichloride cause a reactivation of cholinesterase blocked by phosphoric acid esters (see German Offenlegungsschrift (German Published Specification) No. 1,670,208).

It has also been disclosed that pyridinium salts such as 1-phenacylpyridinium bromide and 1-styrylpyridinium bromide are actuve as anthelmintic agents (see Netherlands Patent No. 6800807). However, the use of these substances as plant-growth regulators has not been hitherto described.

Furthermore, it is known that (2-chloroethyl)-trimethylammonium chloride can be used as a plant-growth regulator, for example for shortening and thickening the stalks of cereals and other crops (see U.S. Pat. Nos. 3,318,910, 3,280,136, 3,264,317 and 3,270,027). The action of this substance is however, not always entirely satisfactory, especially if low amounts and low concentrations are used.

It has now been found that the 2-hydroxyethyl-1-pyridinium-(1) salts of the general formula

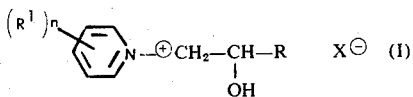

in which
R is optionally substituted phenyl, furyl or thienyl,
n is 1, 2 or 3,
$R^1$ is hydrogen, alkyl with up to 6 carbon atoms or halogen, the substituents $R^1$ being selected independently of one another when n is 2 or 3, and
$X^-$ is a halide or perchlorate ion,
possess very good plant-growth-regulating properties.

The present invention thus provides a plant-growth-regulating composition containing as active ingredient a compound of the formula (I) above in admixture with a solid or liquefied gaseous diluent or carrier or in admixture with a liquid diluent or carrier containing a surface-active agent.

The present invention also provides a method of regulating the growth of plants which comprises applying to the plants or a plant habitat a compound of the formula (I) above, alone or in the form of a composition containing as active ingredient a compound of the formula (I) in admixture with a diluent or carrier.

Preferably R is phenyl, which may carry one or more substituents selected from halogen, (especially chlorine or bromine), straight-chain or branched alkyl of up to 4 carbon atoms, alkoxy of up to 4 carbon atoms, nitro and hydroxyl, or furyl or thienyl (both of which are preferably bonded at the 2-position); $R^1$ is a straight-chain or branched alkyl radical of up to 5 carbon atoms or halogen (especially chlorine and bromine); n is 1 or 2; and $X^-$ is a chloride, bromide, iodide or perchlorate anion.

Surprisingly, the pyridinium salts according to the invention show a substantially stronger plant-growth-regulating action than (2-chloroethyl)-trimethyl-ammonium chloride, which is the nearest active compound of the same type of action known in the art. The invention thus represents a valuable enrichment of the art.

The following may be mentioned as examples of the compounds (I) which can be used according to the invention: N-(2-hydroxy-2-phenyl-ethyl)-pyridinium bromide, N-(2-hydroxy-2-(4'-nitrophenyl)-ethyl)-pyridinium bromide, N-(2-hydroxy-2-(4'-chlorophenyl)-ethyl)-pyridinium bromide, N-(2-hydroxy-2-(2'-chlorophenyl)-ethyl)-pyridinium bromide, N-(2-hydroxy-2-(3'-chlorophenyl)-ethyl)-pyridinium bromide, N-(2-hydroxy-2-(2',6'-dichlorophenyl)-ethyl)-pyridinium bromide, N-(2-hydroxy-2-(3',4'-dichlorophenyl)-ethyl)-pyridinium bromide, N-(2-hydroxy-2-(3'-nitrophenyl)-ethyl)-pyridinium bromide, N-(2-hydroxy-2-(4'-methoxyphenyl)-ethyl)-pyridinium bromide, 4-methyl-N-(2-hydroxy-2-phenyl-ethyl)-pyridinium perchlorate, 2-methyl-N-(2-hydroxy-2-phenyl-ethyl)-pyridinium bromide and N-(2-hydroxy-2-furyl-(2)-ethyl)-pyridinium bromide.

A number of the compounds which can be used according to the invention are known (see Chemische Berichte 66, 606 (1933); ibidem 67, 656–667 (1934); 68, 1351–1359 (1935); 70, 964–873 (1937); 72, 2000–2009 (1939); 84, 404–411 (1951); Comptes Rendues 198, 1430 (1934); J. Amer. Chem. Soc. 54, 4407 (1932); ibidem 66, 894–895 (1944); 71, 3498–3500 (1949); 72, 2507–2508 (1950); 91, 6115–6121 (1969); Tetrahedron Letters (1969) 1383–1386).

Those which have not yet been described in the literature can be produced in a simple manner in accordance with the known processes. Thus, the compounds which can be used according to the invention are obtained, for example, in a "one-pot reaction" if a halogenoacetic acid, optionally in an inert organic solvent, is treated first with an excess of an optionally substituted pyridine and thereafter with an excess of an aromatic aldehyde at room temperature, and the reaction mixture is then slowly heated to 120°–180°C. and left at this temperature for 1 to 4 hours. After cooling the solution, the reaction product which crystallizes is isolated in the customary manner by filtration.

The preparation of the active compounds used in this invention is illustrated in the following Examples:

EXAMPLE 1

Preparation of
1-(2-hydroxy-2-phenylethyl)-pyridinium bromide

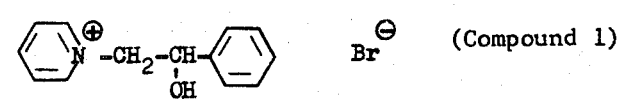

(Compound 1)

948 g. (12 moles) of pyridine dried over potassium hydroxide, followed by 2,544 g. (24 moles) of freshly distilled benzaldehyde, were added to a solution of 834 g. (6 moles) of bromoacetic acid in 6,000 ml. of nitrobenzene while stirring at room temperature. After a few minutes, the reaction mixture began to turn cloudy and gradually assumed a viscous consistency. It was then slowly heated to 130°C. bath temperature. A strong evolution of CO₂ took place.

After about two and half hours, the decarboxylation was complete; the mixture was cooled to room temperature and the pyridinium salt which had separated out was filtered off, rinsed with 3 liters of ether and dried in vacuo at 80°C.

1,520 g. (90% of theory) of 1-(2-hydroxy-2-phenylethyl)-pyridinium bromide of melting point 236°–239°C were obtained.

For further purification, the resulting product was boiled with about 3 liters of ethanol, during which the salt remained undissolved. After filtration, 1,274 g. (75.5% of theory) of 1-(2-hydroxy-2-phenylethyl)-pyridinium bromide of melting point 239°–241°C. were obtained.

The following compounds of the general formula

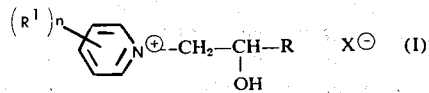

can be prepared by a method analogous to that described in Example 1.

Table 1

| Example (Compound) No. | R | R¹ | n | X | Melting point in °C |
|---|---|---|---|---|---|
| 2 | (furyl-2) | H | 1 | Br | 214–215 decomposition |
| | 1-(2-hydroxy-2-(furyl-2)-ethyl)-pyridinium bromide | | | | |
| 3 | phenyl-NO₂ | H | 1 | Br | 275–275.5 |
| | 1-(2-hydroxy-2-(4-nitrophenyl)-ethyl)-pyridinium bromide | | | | |
| 4 | phenyl | 4—CH₃ | 1 | ClO₄ | 143–145 |
| 5 | phenyl-Cl | H | 1 | Br | 277–278 decomposition |
| 6 | phenyl-Cl | H | 1 | Br | 214–217 |
| 7 | dichlorophenyl | H | 1 | Br | 292–293 |
| 8 | phenyl-OCH₃ | H | 1 | Br | 175–177 |
| 9 | dichlorophenyl | H | 1 | Br | 180–182 |
| 10 | phenyl-NO₂ | H | 1 | Br | 214–216 |
| 11 | phenyl | 3—CH₃ | 1 | Br | 158–161 |
| 12 | phenyl | 2—CH₃, 5—C₂H₅ | 2 | Br | 188–191 |
| 13 | phenyl | 2—CH₃ | 1 | Br | 225–227 |
| 14 | dichlorophenyl | 4—CH₃ | 1 | Br | 189–192 |
| 15 | phenyl | 4—CH₃ | 1 | Br | 172–175 |

Table 1—Continued

| Example (Compound) No. | R | R¹ | n | X | Melting point in °C |
|---|---|---|---|---|---|
| 16 | 4-Br-phenyl | H | 1 | Br | 225–230 |
| 17 | 4-CH₃-phenyl | 2—CH₃ | 1 | Br | 177–180 |
| 18 | 2,6-diCl-phenyl | H | 1 | Br | 271 |
| 19 | 2-Cl-4-NO₂-phenyl | H | 1 | Br | 238–239 |
| 20 | 2-OCH₃-phenyl | H | 1 | Br | 208 |
| 21 | 4-OC₂H₅-phenyl | H | 1 | Br | approx.150 decomposition |
| 22 | 4-CH(CH₃)₂-phenyl | H | 1 | Br | 190–192 |
| 23 | 2-NO₂-phenyl | H | 1 | Br | 223 |
| 24 | 3-OCH₃-phenyl | H | 1 | Br | 165–166 |
| 25 | 3,4-diOCH₃-phenyl | H | 1 | Br | 180 |
| 26 | 4-OH-phenyl | H | 1 | Br | 268 |
| 27 | 3-Br-phenyl | H | 1 | Br | 232–233 |
| 28 | 2-CH₃-3-NO₂-phenyl | H | 1 | Br | 217–218 |
| 29 | 2-CH₃-3-Br-phenyl | H | 1 | Br | 215–217 |
| 30 | 2,3-diCH₃-phenyl | H | 1 | Br | 232–233 |

Table 1—Continued

| Example (Compound) No. | R | R¹ | n | X | Melting point in °C |
|---|---|---|---|---|---|
| 31 | 2,3-(CH₃)₂-C₆H₃- | H | 1 | Br | 210 |
| 32 | 2-OCH₃-6-Br-C₆H₃- | H | 1 | Br | 224–225 |
| 33 | 2-Br-C₆H₄- | H | 1 | Br | 213 |
| 34 | C₆H₅- | 3—Br | 1 | Br | 209–211 |
| 35 | 4-Br-C₆H₄- | 3—Br | 1 | Br | 246 |
| 36 | C₆H₅- | 3,5—Br | 2 | Br | 220–221 |
| 37 | C₆H₅- | 4—C₅H₁₁ | 1 | Br | 166–167 |
| 38 | 2-thienyl | H | 1 | Br | 231–233 |
| 39 | C₆H₅- | H | 1 | Cl | 245–246 |
| 40 | C₆H₅- | H | 1 | I | 252–255 |
| 41 | 2-thienyl | H | 1 | I | 236–237 |
| 42 | C₆H₅- | 3—CH₃ | 1 | I | 175–177 |
| 43 | C₆H₅- | H | 1 | ClO₄ | 217–218 |
| 44 | C₆H₅- | 3—CH₃ | 1 | ClO₄ | 181–182 |
| 45 | 2-thienyl | H | 1 | ClO₄ | 206 |
| 46 | C₆H₅- | 2—Cl | 1 | ClO₄ | 131 |
| 47 | 4-Cl-C₆H₄- | H | 1 | Br | 183 decomposition |
| 48 | 3-Cl-C₆H₄- | H | 1 | ClO₄ | 198–199 |
| 49 | 2-Cl-C₆H₄- | H | 1 | ClO₄ | 176–177 |

Table 1 —Continued

| Example (Compound) No. | R | R¹ | n | X | Melting point in °C |
|---|---|---|---|---|---|
| 50 | 2-OCH₃-phenyl-CH₂- | H | 1 | ClO₄ | 175 |
| 51 | 4-NO₂-phenyl-CH₂- | H | 1 | ClO₄ | 185–186 |
| 52 | 2,6-Cl₂-phenyl-CH₂- | H | 1 | ClO₄ | 283–284 |
| 53 | 2,4-Cl₂-phenyl-CH₂- | H | 1 | ClO₄ | 237–238 |
| 54 | 4-CH(CH₃)₂-phenyl-CH₂- | H | 1 | ClO₄ | 183 |
| 55 | 3-Br-4-OCH₃-phenyl-CH₂- | H | 1 | ClO₄ | 187–189 |
| 56 | 2,4,6-(CH₃)₃-phenyl-CH₂- | H | 1 | Cl | 245–246 |

The active compounds to be used according to the invention interfere in the physiological phenomena of plant growth and can therefore be used as excellent plant-growth regulators.

The different effects of the active compounds depend essentially on the time at which they are used, relative to the stage of development of the seed or of the plant, and on the concentrations used.

Plant-growth regulators are used for various purposes, related to the stage of development of the plant.

In many crop plants, inhibition of vegetative growth permits denser planting of the crop so that a greater yield relative to soil area can be achieved. Furthermore, the increase in yield when using growth-inhibiting agents can be based on the fact that the vegetative growth is restricted and hence the nutrients benefit blossom formation and fruit formation to a greater extent.

Using the compounds according to the invention, vegetative growth can also be promoted, depending on the employed concentration of the active compounds and the type of plant. This is of great value if the vegetative parts of the plant are harvested. Promotion of vegetative growth can however also simultaneously lead to promotion of generative growth so that, for example, more fruit, or larger fruit, is formed.

It is also possible to use the active compounds to delay the shooting of buds or the germination of seed, for example to avoid damage through late frosts in areas where frost is a hazard.

The active compounds according to the present invention can be converted into the usual formulations, such as solutions, emulsions, suspensions, powders, pastes and granulates. These may be produced in known manner, for example by mixing the active compounds with extenders, that is, liquid or solid or liquefied gaseous diluents or carriers, optionally with the use of surface-active agents, that is, emulsifying agents and-/or dispersing agents and/or foam-forming agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone; or strongly polar solvents, such as dimethyl formamide, dimethyl sulfoxide or acetonitrile, as well as water.

By liquefied gaseous diluents or carriers are meant liquids which would be gaseous at normal temperatures and pressures, for example aerosol propellants, such as halogenated hydrocarbons, for example freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or silicates.

Preferred examples or emulsifying and foam-forming agents include non-ionic and anionic emulsifiers, such as polyoxy-ethylene-fatty acid esters, polyoxyethylene-fatty alcohol ethers, for example alkylarylpolyglycol ethers, alkyl sulfonates, alkyl sulfates and aryl sulfonates as well as albumin hydrolyzation products; and preferred examples of dispersing agents include lignin sulfite waste liquors and methyl cellulose.

The active compounds according to the invention can be present in the formulations as a mixture with other active compounds.

The formulations in general contain from 0.1 to 95 per cent, preferably from 0.5 to 90 percent, by weight of active compound.

The active compounds can be used as such, in the form of their formulations or in the application forms prepared therefrom by further dilution, such as ready-to-use solutions, emulsions, foams, suspensions, powders, pastes and granules. They are used in the customary manner, for example by watering, squirting, spraying, dusting, sprinkling, dry dressing, moist dressing, wet dressing, slurry dressing or encrusting.

The present invention further provides plants, the growth of which has been regulated by their being grown in areas in which immediately prior to and/or during the time of the growing a compound of the formula (I) above was applied, alone or in admixture with a diluent or carrier.

The examples which follow illustrate some of the types of activity of the compounds of the formula (I) as growth regulators, without thereby excluding the possibility of further uses as growth regulators.

EXAMPLE A:

Increase in yield of radishes

Solvent: 10 parts by weight of methanol
Emulsifier: 2 parts by weight of polyethylene-sorbitan monolaurate To prepare an appropriate preparation of the active compound, 1 part by weight of active compound was mixed with the stated amount of solvent and emulsifier and made up to the desired concentration with water.

20 radish plants were grown in plastic dishes and at the point in time at which the thickening of the hypocotyl commenced they were sprayed with the active-compound preparation, or with a corresponding solution without active compound (control), until dripping wet. After growing for 3 weeks in a greenhouse, the hypocotyls were harvested and the fresh weight was determined. The results can be seen from Table which follows:

Table A

| Active compound | Concentration in ppm | Increase in yield in % of the control (= 100) |
|---|---|---|
| (Compound 1) | 500 | 115 |
| | 50 | 125 |

EXAMPLE B

Promotion of growth in tomatoes

Solvent: 10 parts by weight of methanol
Emulsifier: 2 parts by weight of polyethylene-sorbitan monolaurate To prepare an appropriate preparation of the active compound, 1 part by weight of active compound was mixed with the stated amount of solvent and emulsifier and made up to the desired concentration with water.

3-week-old tomato plants were sprayed with the active compound preparation or with a corresponding solution without active compound (control) until dripping wet. After 9 days' growth in a greenhouse, the additional growth of the treated plants was determined in comparison with the control plants. The results can be seen from the Table which follows:

Table B

| Active compound | Concentration in ppm | Promotion of growth in % of the control (= 100) |
|---|---|---|
| (Compound 1) | 500 | 125 |
| (Compound 2) | 500 | 150 |
| | 200 | 130 |

EXAMPLE C
Retardation of blossoming in tomatoes

Solvent: 10 parts by weight of methanol
Emulsifier: 2 parts by weight of polyethylene-sorbitan monolaurate To prepare an appropriate preparation of the active compound, 1 part by weight of active compound was mixed with the stated amount of solvent and emulsifier and made up to the desired concentration with water.

Tomato plants were grown in a greenhouse up to the stage of blossoming and shortly before the buds opened the plants were sprayed with the active-compound preparation or with a corresponding solution without active compound (control) until dripping wet. 5 plants were used for each treatment. At the point in time at which 100% of the buds had blossomed in the control plants, the proportion of blossomed buds in % of the total number of buds was determined in the treated plants. Inflorescences which were only formed after the treatment with the preparations were not taken into account. The results can be seen from Table C which follows:

Table C

| Active compound | Concentration in ppm | Buds which have blossomed, in % of the control (= 100) |
|---|---|---|
| 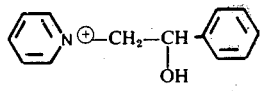 (Compound 1) | 500 | 85 |
| 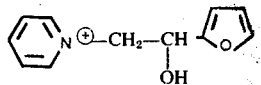 (Compound 2) | 500<br>125<br>50 | 65<br>65<br>85 |

EXAMPLE D
Promotion of growth in barley

Solvent: 10 parts by weight of methanol
Emulsifier: 2 parts by weight of polyethylene-sorbitan monolaurate To prepare an appropriate preparation of the active compound, 1 part by weight of active compound was mixed with the stated amount of solvent and emulsifier and made up to the desired concentration with water.

Young barley plants, 5–8 cm. high, were sprayed with the active-compound preparation until dripping wet. After 14 days the additional growth was measured and the promotion of growth was calculated in % of the additional growth of control plants.

The active compounds, active-compound concentrations and results can be seen from Table D which follows:

Table D

Promotion of growth in barley

| Active compound | Concentration in ppm | Promotion of growth in % of the control (= 100) |
|---|---|---|
| 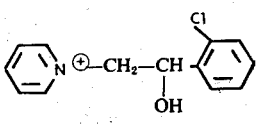 (Compound 5) | 500 | 115 |
| 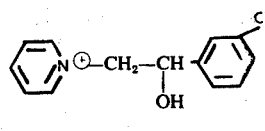 (Compound 6) | 500 | 120 |
| 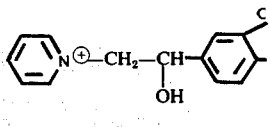 (Compound 9) | 500 | 115 |

Table D—Continued

Promotion of growth in barley

| Active compound | Concentration in ppm | Promotion of growth in % of the control (= 100) |
| --- | --- | --- |
| Pyridinium-CH$_2$-CH(OH)-(3-NO$_2$-phenyl) Br$^-$ (Compound 10) | 500 | 115 |

EXAMPLE E

Inhibition of growth in beans

Solvent: 10 parts by weight of methanol
Emulsifier: 2 parts by weight of polyethylene-sorbitan monolaurate.

To prepare an appropriate preparation of the active compound, 1 part by weight of active compound was mixed with the stated amount of solvent and emulsifier and made up to the desired concentration with water.

Young bean plants, about 10 cm. high, were sprayed with the active-compound preparation until dripping wet. After 14 days, the additional growth was measured and the inhibition of growth was calculated in % of the additional growth of control plants.

The active compounds active-compound concentrations and results can be seen from Table E which follows:

Table E

Inhibition of growth in beans

| Active compound | Concentration in ppm | Inhibition of growth in % of the control (= 100) |
| --- | --- | --- |
| Cl—CH$_2$—CH$_2$—N$^+$—(CH$_3$)$_3$Cl$^-$ (Known compound) | 500 | 25 |
| Pyridinium-CH$_2$-CH(OH)-(2,6-diCl-phenyl) Br$^-$ (Compound 7) | 500 | 70 |
| 3-CH$_3$-Pyridinium-CH$_2$-CH(OH)-phenyl Br$^-$ (Compound 11) | 500 | 35 |
| 2,5-diCH$_3$-Pyridinium-CH$_2$-CH(OH)-phenyl Br$^-$ (Compound 12) | 500 | 70 |
| Pyridinium-CH$_2$-CH(OH)-(4-OCH$_3$-phenyl) Br$^-$ (Compound 8) | 500 | 40 |
| 3-CH$_3$-Pyridinium-CH$_2$-CH(OH)-phenyl ClO$_4^-$ (Compound 4) | 500 | 45 |
| Pyridinium-CH$_2$-CH(OH)-(2-Cl-phenyl) Br$^-$ (Compound 6) | 500 | 80 |

Table E—Continued

Inhibition of growth in beans

| Active compound | | Concentration in ppm | Inhibition of growth in % of the control (= 100) |
|---|---|---|---|
| 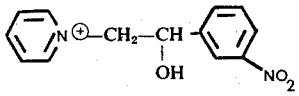 (Compound 10) | Br⊖ | 500 | 30 |
| 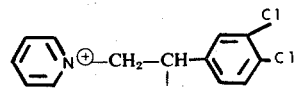 (Compound 9) | Br⊖ | 500 | 80 |

It will be understood that the specification and examples are illustrative but not limitative of the present invention and that other embodiments within the spirit and scope of the invention will suggest themselves to those skilled in the art. The concentrations of active compound can be varied within a fairly wide range for actual application. In general, concentrations of 0.0005 to 2 percent by weight, preferably from 0.01 to 0.5 percent are used. There are applied, in general, 0.01 to 10 kg, preferably 0.05 to 5 kg, of active compound per hectare of soil area.

What is claimed is:

1. Method of influencing the growth of plants which method comprises applying thereto a regulatingly effective amount of a composition containing as an active ingredient a 2-hydroxyethyl-1-pyridinium-(1) salt of the formula

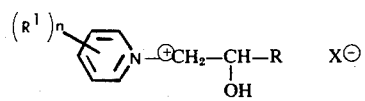

wherein

R is phenyl; substituted phenyl wherein the substituent is at least one of halogen, alkyl of up to 4 carbon atoms, alkoxy of up to 4 carbon atoms, nitro and hydroxyl; furyl; or thienyl;

$n$ is 1, 2 or 3;

$R^1$ is hydrogen, alkyl of up to 6 carbon atoms or halogen; the $R^1$ substituents being selected independently when $n$ is 2 or 3; and $X^-$ is a halide or perchlorate ion;

2. Method as claimed in claim 1 wherein R in the formula is phenyl, furyl or thienyl; $R^1$ is alkyl of up to 5 carbon atoms or halogen; $n$ is 1 or 2; and $X^-$ is chloride, bromide, iodide or perchlorate ion.

3. Method as claimed in claim 1 wherein R in the formula is substituted phenyl.

4. Method as claimed in claim 1 wherein said compound
   1-(2-hydroxy-2-phenylethyl)-pyridinium bromide
   1-(2-hydroxy-2-(furyl-2)-ethyl)-pyridinium bromide
   1-(2-hydroxy-2-(4-nitrophenyl)-ethyl)-pyridinium bromide
   1-(2-hydroxy-2-(3-chlorophenyl)-ethyl)-pyridinium bromide and
   1-(2-hydroxy-2-phenylethyl)-3-methylpyridinium bromide 5. Method as claimed in claim 1 wherein said compound is applied at a dosage of from 0.05 to 5 kgs./hectare.

6. Method as claimed in claim 1 wherein said compound is applied to cause promotion of plant growth and the dosage applied is from 0.05 to 5 kgs./hectare.

7. Method as claimed in claim 1 wherein said compound is applied to delay the growth of plants and wherein the dosage of said compound applied is from 0.05 to 5 kg./hectare.

* * * * *